May 16, 1967  J. W. RYAN  3,319,957
ROCKING HORSE WITH MOVING LEGS
Filed March 22, 1962  5 Sheets-Sheet 1

INVENTOR.
JOHN W. RYAN
BY Albert Merzig
ATTORNEY

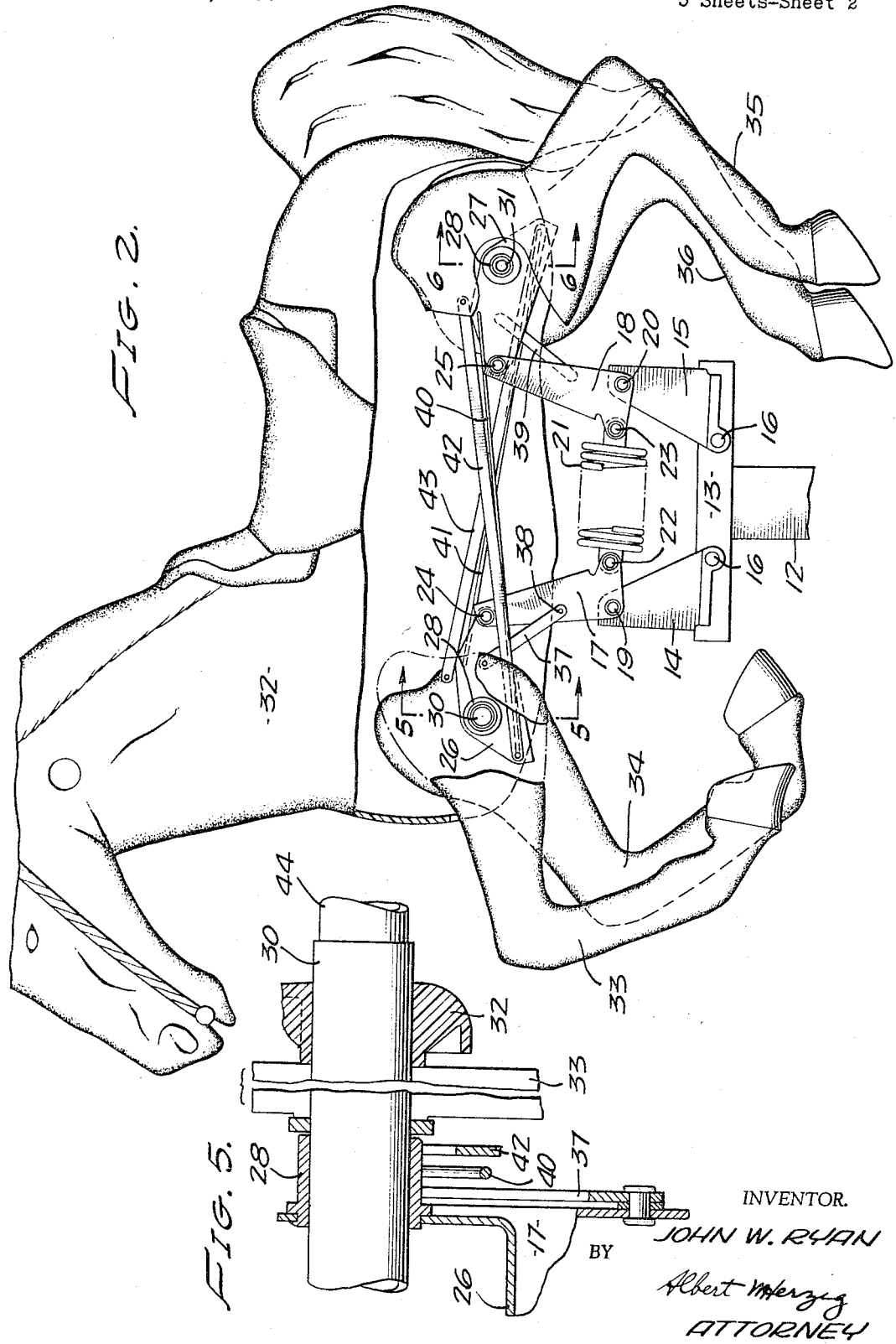

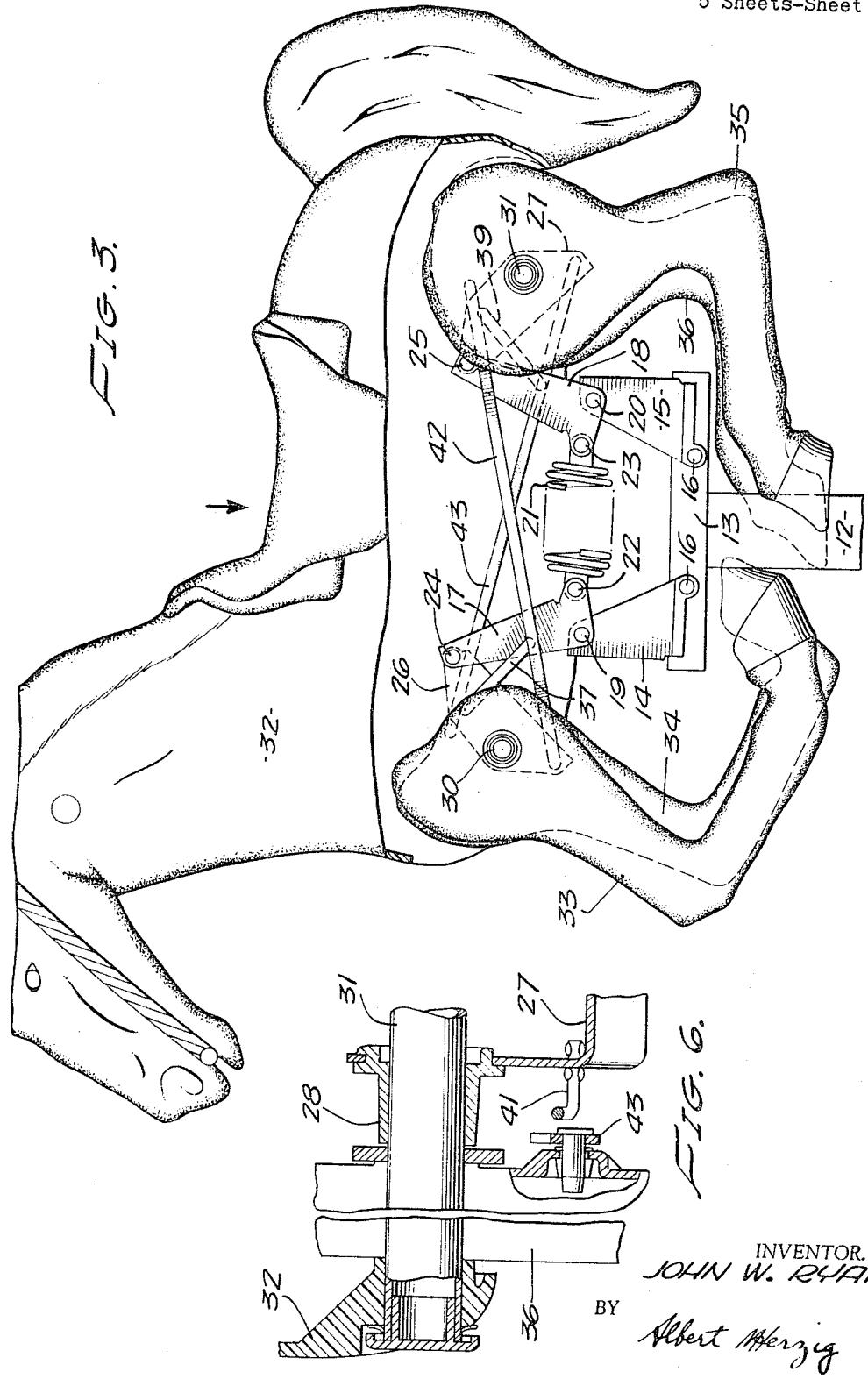

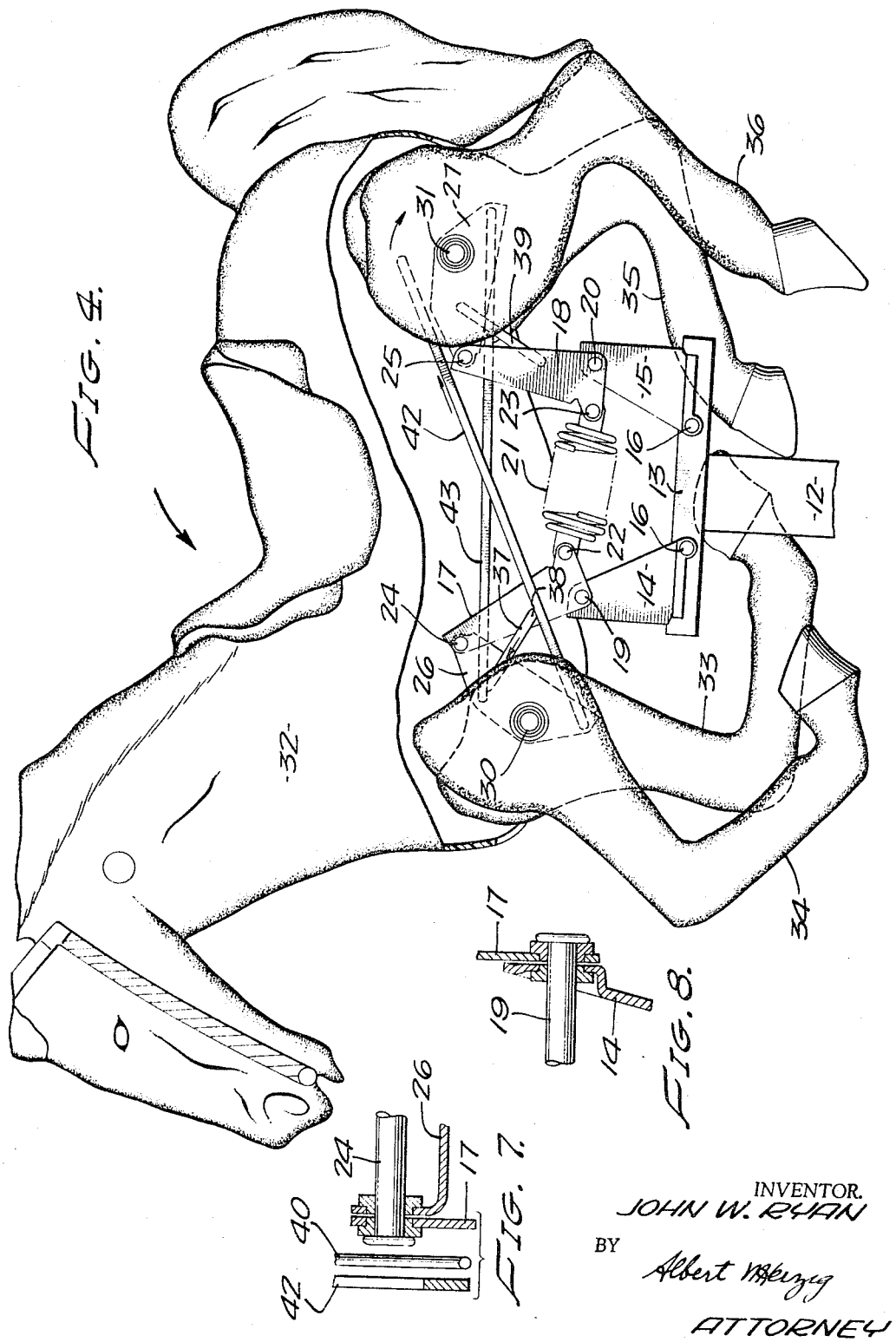

May 16, 1967  J. W. RYAN  3,319,957
ROCKING HORSE WITH MOVING LEGS
Filed March 22, 1962  5 Sheets-Sheet 5

INVENTOR.
JOHN W. RYAN
BY Albert Merzig
ATTORNEY

United States Patent Office 3,319,957
Patented May 16, 1967

3,319,957
ROCKING HORSE WITH MOVING LEGS
John W. Ryan, 11027 Cashmere St.,
Bel Air, Calif. 94558
Filed Mar. 22, 1962, Ser. No. 181,711
2 Claims. (Cl. 272—53.2)

This invention relates to children's recreation apparatus and more especially to rocking horses, sometimes known as hobby horses.

An object of the invention is to provide a novel and improved embodiment of a recreation structure or apparatus of the character described.

Another object of the invention is to provide a novel rocking horse capable of having a more realistic action simulating the live animal.

A further object of the invention is to provide, in a rocking horse apparatus, a resilient or mounting structure capable of having a novel combination of rotary and oscillatory movements in both the vertical and horizontal directions.

An additional object of the invention is to provide in a rocking horse structure a novel pivot mounting of the legs of the horse and actuating mechanism therefore which permits a leg actuation which closely simulates that of a galloping horse.

Another object of the invention is to provide novel improvements in a rocking horse structure wherein the leg actuation of the horse is accomplished by either bouncing translational or rocking pivotal action and any combination of these movements.

A further object of the invention is to provide novel improvements in a rocking horse structure wherein the extent of the rocking or bouncing movement is substantially independent of the weight of the person riding the horse.

The foregoing and other objects of the invention will appear and be brought out more fully in the following specification, reference being had to the accompanying drawings, wherein:

FIGURE 2 is the side elevation view of the same showing the actuating mechanism in the normal or at rest position or condition.

FIGURE 3 is a view similar to FIGURE 2 showing the actuating mechanism in an actuated condition during a bouncing movement.

FIGURE 4 is a view similar to FIGURE 3 showing the actuating mechanism in an actuated rocking condition.

FIGURE 5 is a fragmentary view in section taken along line 5—5 of FIGURE 2.

FIGURE 6 is a fragmentary view in section taken along line 6—6 of FIGURE 2.

FIGURE 7 and 8 are fragmentary views in section showing detail parts.

Figure 12:
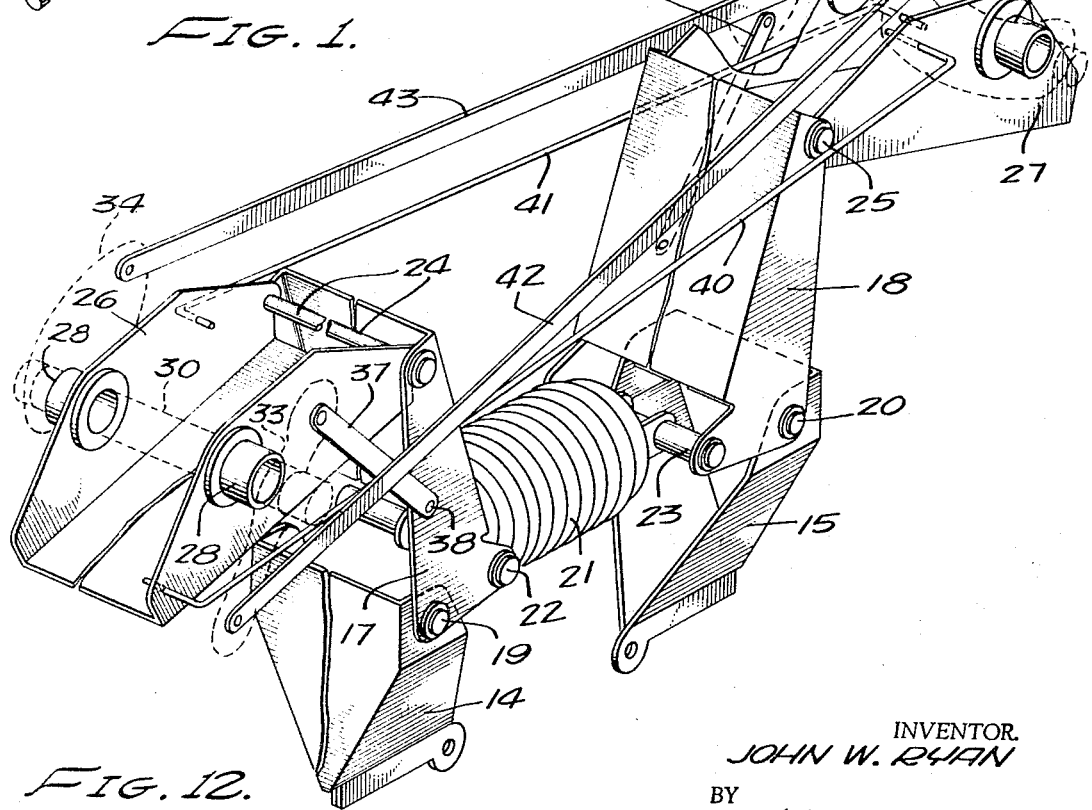
FIGURE 12 is a perspective view of the principal actuating mechanism of the invention.

Referring more particularly to the drawing and especially to FIGURES 2 and 12, the invention is exemplified in a structure having a base comprising frame members 10 and 11 and a stanchion 12 at the upper end of which is a horizontal or supporting plate or stand 13. A pair of longitudinal stand members 14 and 15, front and rear respectively, are secured by bolts or rock shafts 16 to supporting plate or stand 13. A pair of bell cranks or stand links 17 and 18 are respectively secured by pivot pins 19 and 20 to longitudinal stand members 14 and 15 and a tension spring 21 is secured by pivot pins 22 and 23 respectively to one arm each of the pair of bell cranks or stand links 17 and 18.

Stand links 17 and 18 are in the form of channels and a pivot pin 24 is secured across the upper end of stand link 17 and a similar pivot pin 25 extends across the upper end of stand link 18. A front axle link member 26 is pivotally secured at one end thereof to shaft or pivot pin 24 and a rear axle link member 27 is similarly secured to pivot pin 25. The axle links numbers 26 and 27 each have a pair of bearing hubs 28 on their outer flange portions and a front axle 30 is mounted in the bearing hubs 28 of the front axle link 26 and a rear axle 31 is similarly carried by rear axle link bearing hubs 28.

The horse body is indicated at 32 and is hollow and made of any suitable lightweight material and having openings in the lower sidewalls thereof through which front and rear axles 30 and 31 respectively extend. Left and right front legs 33 and 34 respectively have enlarged upper and thigh portions and are pivotally mounted on front axle 30. Left and right rear legs 35 and 36 respectively are similarly mounted on rear axle 31. A leg tie link or actuating link 37 has one end thereof pivotally secured at 38 to an upwardly extending arm of bell crank or stand link 17 and its other end pivotally secured to enlarged upper end of left front leg 33 somewhat rearwardly of axle 30, in the normal or unmoved position of the mechanism as seen in FIGURE 2. A similar leg tie link or actuating link 39 is secured to bell crank or stand link 18 and to right rear leg 36 at a point substantially forward of rear axle 31.

A left side tie-rod 40 is pivotally connected to front axle link 26 at a point substantially forwardly of axle 30, as seen in FIGURE 12, and is pivotally connected at its rear end to rear axle link 27 also forwardly of rear axle 31. A right side tie link 41 is similarly connected to the front and rear axle links 26 and 27 respectively the connection being rearwardly of the axles, as seen in FIGURE 12. A left leg tie link means 42 has its forward end connected to the left front leg 33 and its rear end connected to left rear leg 35 somewhat above and to the left of rear axle 31, as seen in FIGURE 2. A right leg tie link means 43 has its rear end pivotally attached to the right rear leg, as shown in FIG. 6, and its forward end pivotally secured to right front leg 34 to the right of and slightly above front axle 30. Front axle 30 has lateral extensions 44 which serve as foot rests.

One phase of operation and actuation of the invention can be clearly seen by comparison of FIGURES 2 and 3. FIGURE 2 shows the parts in normal or at rest position and condition while FIGURE 3 shows the condition of and relation of the parts after a bouncing or vertical movement without substantial rocking or rotation. Upon bouncing movement to the position of FIGURE 3 from that of FIGURE 2 the front and rear axles 30 and 31 will cause front and rear axle links 26 and 27 to be swung downwardly on pivot pins 24 and 25 and this movement will swing bell crank stand links 17 and 18 thus separating their upper ends as well as the spacing of pivot pins 22 and 23, thus tensioning spring 21 which will limit this movement by reason of its design characteristics.

Figure 9:
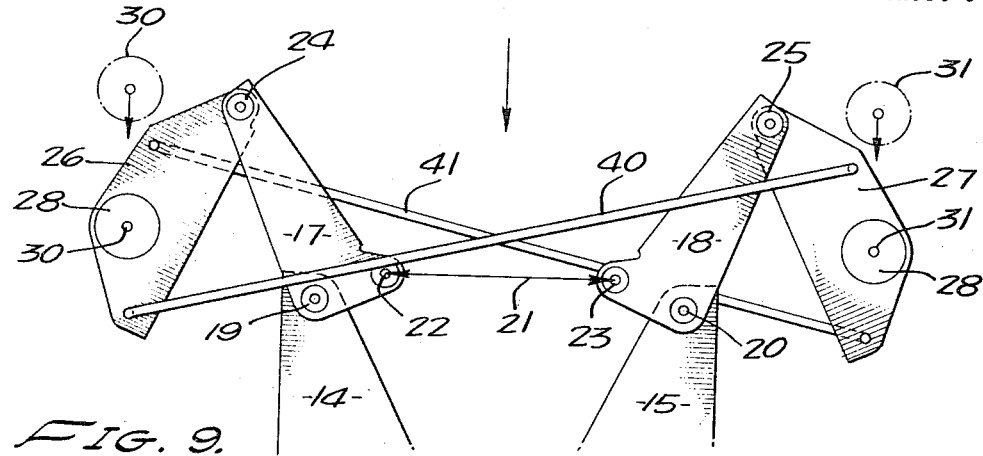
FIGURE 9 is a diagrammatic view showing the principal actuating mechanism after a bouncing actuating movement.

The described bouncing or downward movement of the front axle 30, which pivots the front legs thereon, will cause counterclockwise rotation of left front leg 33 by reason of the pivot connection thereof to the upper end of link 37, the lower end of which moves only slightly toward the left. This counterclockwise movement of front axle link 26 will cause clockwise rotation of rear axle link 27 by reason of the rod and link connections 40, 41, 42 and 43. During the same movement left rear leg 35 will be swung in clockwise direction by the reason of its connection to leg tie link 42, which connection is seen to be substantially above rear axle 31. In a similar manner, right rear leg 36 will be swung in a clockwise direction by reason of its connection to the upper end of tie link 39 and at the same time right front leg 34 will be swung in counterclockwise direction by leg tie link 43, the rear end of which is connected to rear axle link 27. These link movements are clearly and separately indicated in the diagrammatic view of FIGURE 9 which shows their position after or at the lower end of a bouncing or downward movement. It will be observed that during this bouncing movement both front legs will have been swung counterclockwise and both rear legs will have been swung clockwise.

Figure 10:
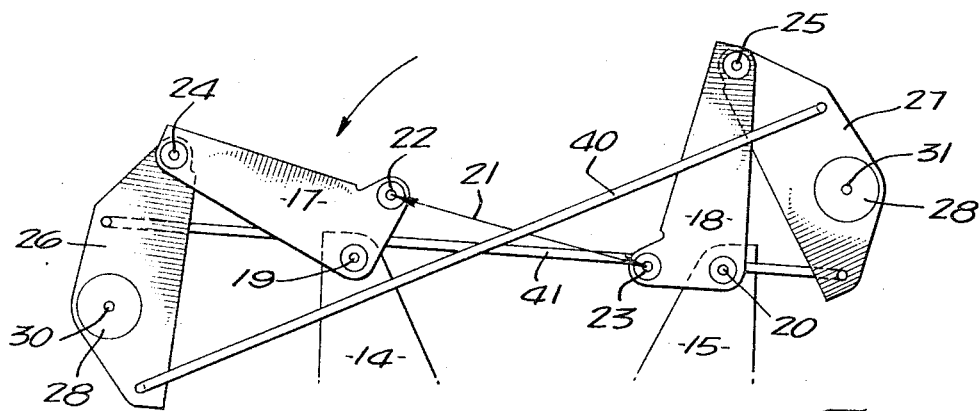
FIGURE 10 is a view similar to FIGURE 9 showing the principal actuating mechanism after a forward rocking movement.
Figure 11:
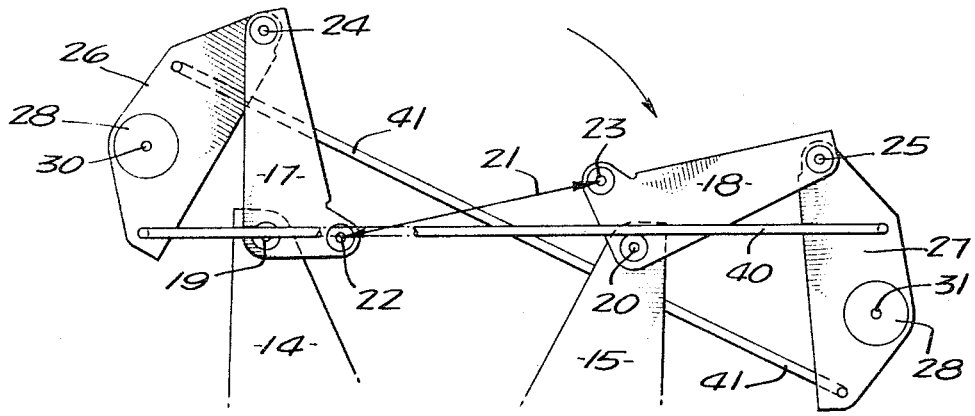
FIGURE 11 is a view similar to FIGURE 10 after a backward rocking movement.

Comparison of FIGS. 2 and 10 show and illustrate the action of the mechanism at the end of a forward rocking movement. In FIG. 10, front axle 30 has been lowered and swung forwardly farther from link 17 from the rest position of FIG. 2 and as a result the left front leg 33 has been swung clockwise or forwardly by link 37 and, through link 42, left rear leg 35 has been swung counterclockwise or rearwardly, moving both left feet farther apart. Since the right legs are controlled by links 39 and 43, and since links 40 and 41 have caused rear axle 31 to swing downwardly and toward link 18, the right legs have been swung to move their feet closer together. As is obvious, rearward rocking movement reverses the above-described relative movements between axle 30 and link 17 and between axle 31 and link 18 and causes both left feet to be moved toward each other and both right feet to be moved apart.

It will be clear that vertical bouncing movements will cause both links 17 and 18 to simultaneously swing closer to their respective axles 30 and 31 (FIG. 9) and away therefrom, thus causing both front and rear feet to swing toward and from each other at the same time. It will further be obvious that combined rocking and bouncing movements will modify the leg movements described.

Figure 1:
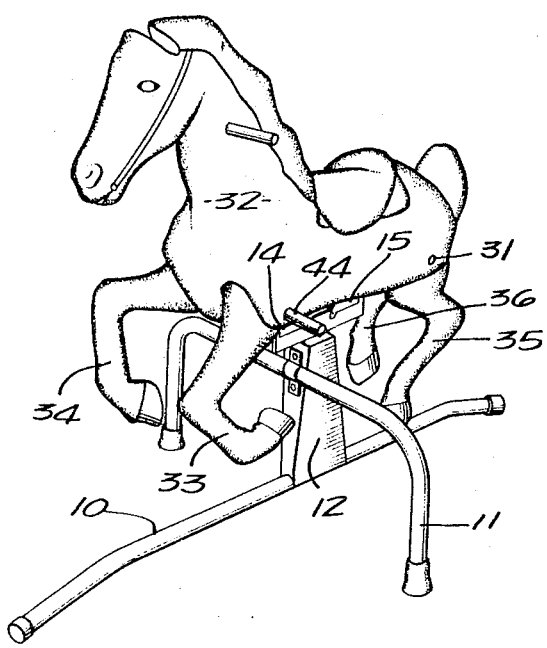
FIGURE 1 is a perspective view of a rocking horse embodying the present invention.
Figure 13:
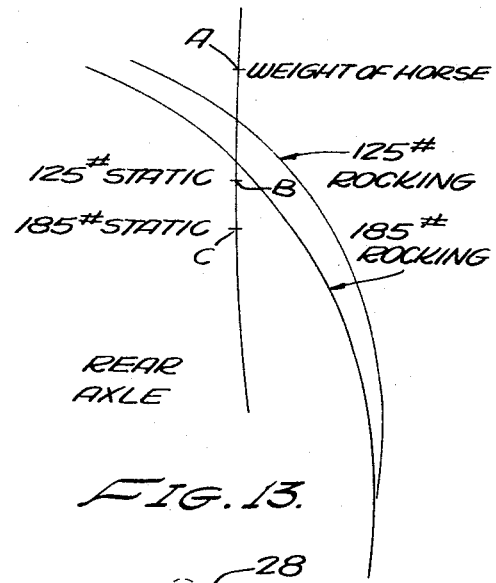
FIGURE 13 is a diagrammatic view showing comparative body movement of the rocking horse carrying, respectively, a light and a heavy rider.

The extent of the bouncing and rocking movements is substantially independent of the weight of the rider and is nearly the same for a lightweight person such as a child as for a heavyweight such as a man, as illustrated in FIGURE 13. This figure shows the movements of the rear axle 31 downwardly from the point A to the point B with a relatively light rider such as a child weighing 125 lbs. Movement of the axle to the point C by the weight of a 185 lb. rider is seen to be only a slightly additional downward amount. The curves in FIGURE 13 show comparative rocking movements for two such riders and indicates that the paths are quite similar. These novel and unique movements are made possible by the construction and relation of the links 17, 18, 26 and 27 and the tension spring 21 which is a coil spring of heavy construction. Links 40 and 41 and their connection to links 26 and 27 adds to this unique construction and movement.

While the instant invention has been shown and described herein in what is conceived to be the most practical and preferred embodiment, it is recognized that departures may be made therefrom within the scope of the invention, which is, therefore, not to be limited to the details disclosed herein but is to be afforded the full scope of the claims appended hereto.

What is claimed is:

1. A rocking horse having a body, front and rear axles, and legs independently pivoted on said axles, comprising a stanchion, a pair of spaced-apart first links pivotally mounted on said stanchion, a tension spring having its ends respectively connected to each of said first links, front and rear axle links respectively pivotally mounted between the ends thereof on said axles and their adjacent ends respectively pivoted to each of said first links, a pair of crossed tie rods connected to said axle links on opposite sides of their axles, pair of front and rear leg actuating links respectively connected to a front and rear leg at the inner side of the respective leg axle and to each of said first links, and a pair of front and rear leg tie links respectively connected to a front and rear leg on opposite sides of their respective axles.

2. A rocking horse having a body, front and rear axles, and legs independently pivoted on said axles, comprising a stanchion, a pair of spaced-apart bell cranks pivotally mounted on said stanchion, a tension spring having its ends respectively connected to a first arm of each of said bell cranks, front and rear axle links respectively pivotally mounted between the ends thereof on said axles and their adjacent ends respectively pivoted to a second arm of each of said bell cranks, a pair of crossed tie rods connected to said axle links on opposite sides of their pivot axles, a pair of front and rear leg actuating links respectively connected to a front and rear leg at the inner side of the respective leg axle and to the said second arm of each of said bell cranks, and a pair of front and rear leg tie links respectively connected to corresponding front and rear legs on opposite sides of their axles.

References Cited by the Examiner

UNITED STATES PATENTS

| | | | |
|---|---|---|---|
| 348,513 | 8/1886 | Conover | 272—53.2 |
| 2,554,045 | 5/1951 | Minor | 272—53.2 |
| 2,680,020 | 6/1954 | Dwyer | 272—53.2 |

RICHARD C. PINKHAM, *Primary Examiner.*

D. B. LOWE, A. W. KRAMER, F. B. LEONARD,
*Assistant Examiners.*